US010647068B2

(12) United States Patent
Usui

(10) Patent No.: US 10,647,068 B2
(45) Date of Patent: May 12, 2020

(54) COMPOSITE-MATERIAL MOLDING METHOD AND MOLDING DEVICE

(71) Applicant: Nissan Motor Co., Ltd., Yokohama-shi, Kanagawa (JP)

(72) Inventor: Katsuhiro Usui, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 2 days.

(21) Appl. No.: 15/516,751

(22) PCT Filed: Oct. 22, 2014

(86) PCT No.: PCT/JP2014/078140
§ 371 (c)(1),
(2) Date: Apr. 4, 2017

(87) PCT Pub. No.: WO2016/063387
PCT Pub. Date: Apr. 28, 2016

(65) Prior Publication Data
US 2017/0312997 A1  Nov. 2, 2017

(51) Int. Cl.
*B29C 70/48* (2006.01)
*B29C 67/24* (2006.01)
*B29C 39/10* (2006.01)
*B29C 39/24* (2006.01)
*B29C 39/42* (2006.01)
*B29C 39/44* (2006.01)

(52) U.S. Cl.
CPC .............. *B29C 70/48* (2013.01); *B29C 39/10* (2013.01); *B29C 39/24* (2013.01); *B29C 39/42* (2013.01); *B29C 39/44* (2013.01); *B29C 67/246* (2013.01)

(58) Field of Classification Search
CPC ................ B29C 70/48; B29C 45/0005; B29C 2791/006
See application file for complete search history.

(56) References Cited

U.S. PATENT DOCUMENTS 4,692,291 A     9/1987  Angell, Jr.
2004/0081717 A1* 4/2004  Marazita ............. B29C 45/7653
                                                    425/150

FOREIGN PATENT DOCUMENTS

CN        1799823 A      7/2006
CN      101612783 A     12/2009
(Continued)

*Primary Examiner* — Jacob T Minskey
*Assistant Examiner* — Melody Tsui
(74) *Attorney, Agent, or Firm* — Global IP Counselors, LLP

(57) ABSTRACT

A composite material molding method is provided for forming a composite material. The molding includes disposing a reinforcing base material in a cavity inside an openable and closable mold, injecting resin into the cavity in a state in which a clamping pressure is exerted on the mold and curing the resin. When injecting the resin into the cavity, the injection pressure of the resin is adjusted between a first pressure that is higher than the clamping pressure and a second pressure that is lower than the clamping pressure, and the injection pressure of the resin is lowered from the pressure that is higher than the clamping pressure to the pressure that is lower than the clamping pressure at least once. The resin is thereby injected such that the pressure inside the cavity does not exceed the clamping pressure from the start of injection to the end of injection of the resin.

10 Claims, 5 Drawing Sheets

(56) References Cited

FOREIGN PATENT DOCUMENTS

| | | | |
|---|---|---|---|
| CN | 103231486 A | | 8/2013 |
| JP | 52-146475 A | | 12/1977 |
| JP | 52146475 A | * | 12/1977 |
| JP | 3-121818 A | | 5/1991 |
| JP | 2005-193587 A | | 7/2005 |
| JP | 2007-7910 A | | 1/2007 |
| JP | 2007-230175 A | | 9/2007 |
| JP | 2008-302498 A | | 12/2008 |
| JP | 2010-120271 A | | 6/2010 |

* cited by examiner

COMPOSITE-MATERIAL MOLDING METHOD AND MOLDING DEVICE

CROSS-REFERENCE TO RELATED APPLICATIONS

This application is a U.S. National stage application of International Application No. PCT/JP2014/078140, filed Oct. 22, 2014.

BACKGROUND

Field of the Invention

The present invention relates to a composite material molding method and a molding device.

Background Information

In recent years, composite materials made by impregnating a reinforcing base material with resin have been used as automobile parts to reduce the body weight of automobiles. For example, Japanese Laid Open Patent Application No. 2005-193587 discloses a composite material made by impregnating a reinforcing base material with resin. The RTM (Resin Transfer Molding) method, which is suitable for mass production, is attracting attention as a molding method for composite materials. In the RTM method, first, a reinforcing base material is disposed in a cavity inside a mold comprising a lower die (female mold) and an upper die (male mold), which can be opened and closed. Resin is injected from a resin injection port after the mold is closed and fastened, to impregnate the reinforcing base material with resin. Then, a composite material is obtained by curing the resin in the cavity.

SUMMARY

When injecting resin into the cavity, it is possible to shorten the molding time by increasing the injection pressure of the resin. On the other hand, with a high-pressure injection, the pressure inside the cavity increases rapidly and the mold may be opened. If the mold is opened during molding, burrs occur in the molded article, causing defective molding. Consequently, it is necessary to carry out mold clamping by exerting a high clamping pressure with a pressing machine, creating the problems that the pressing machine becomes larger and the equipment cost is accordingly increased.

In order to solve the problems described above, an object of the present invention is to provide a composite material molding method and molding device that are capable of shortening the molding time and suppressing the clamping pressure.

The composite material molding method according to the present invention, which achieves the object described above, is a molding method for forming a composite material by disposing a reinforcing base material in a cavity inside an openable and closable mold, injecting resin into the cavity in a state in which a clamping pressure is exerted on the mold, and curing the resin. When injecting the resin into the cavity, the injection pressure of the resin is adjusted between a first pressure that is higher than the clamping pressure and a second pressure that is lower than the clamping pressure, and the injection pressure of the resin is lowered at least once from the pressure that is higher than the clamping pressure to the pressure that is lower than the clamping pressure. The resin is thereby injected without the pressure inside the cavity exceeding the clamping pressure from the start of injection to the end of injection of the resin.

The composite material molding device according to the present invention which achieves the object described above comprises an openable and closable mold in which is formed a cavity for disposing a reinforcing base material, a pressing part that exerts a clamping pressure on the mold, a resin injection unit that injects resin into the cavity, a pressure adjustment unit that is provided in the resin injection unit and that can freely adjust the injection pressure of the resin, and a control unit that controls the operation of the pressure adjustment unit based on the pressure inside the cavity. The control unit controls the operation of the pressure adjustment unit, adjusts the injection pressure of the resin between the first pressure that is higher than the clamping pressure and the second pressure that is lower than the clamping pressure, and lowers the injection pressure of the resin at least once from the pressure that is higher than the clamping pressure to the pressure that is lower than the clamping pressure. The resin is thereby injected without the pressure inside the cavity exceeding the clamping pressure from the start of injection to the end of injection of the resin.

DETAILED DESCRIPTION OF THE EMBODIMENTS

Figure 1:
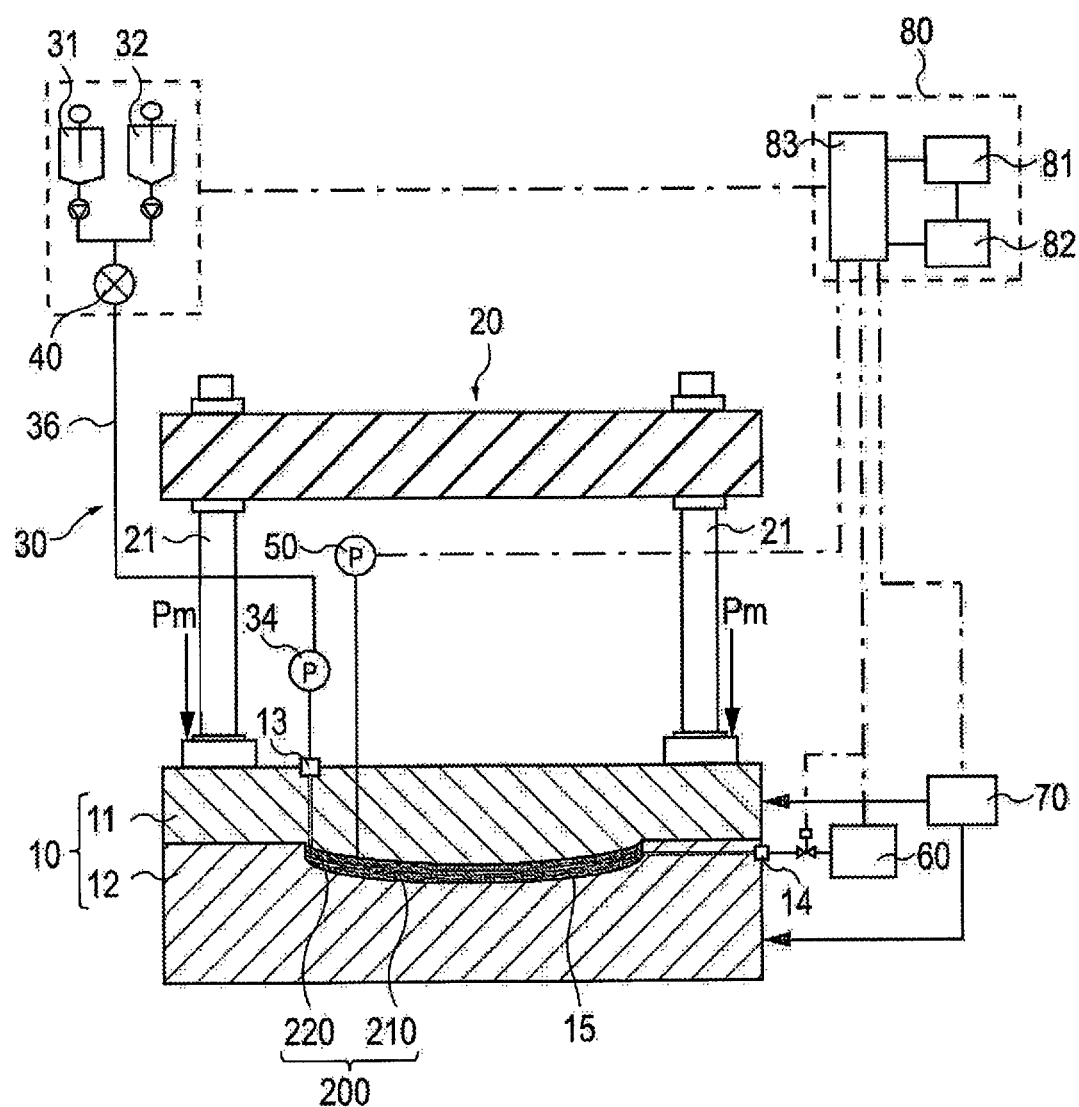
FIG. 1 is a schematic view of the composite material molding device according to the present embodiment.

Embodiments of the present invention will be explained below, with reference to the appended drawings. The description below does not limit the technical scope or the meanings of the terms described in the claims. The dimensional ratios in the drawings are exaggerated for convenience of explanation and are different from the actual ratios.

Figure 2:
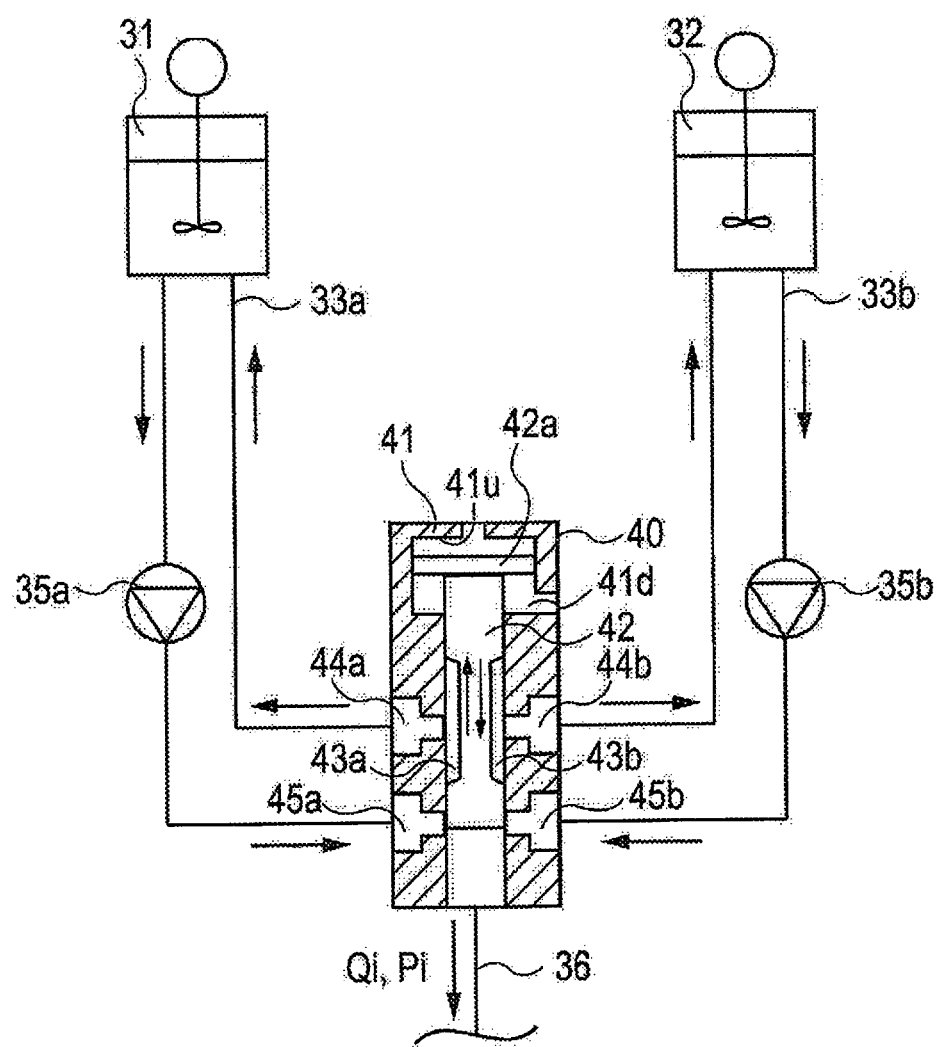
FIG. 2 is a schematic view illustrating the configuration of the resin injection unit according to the present embodiment.
Figure 3:
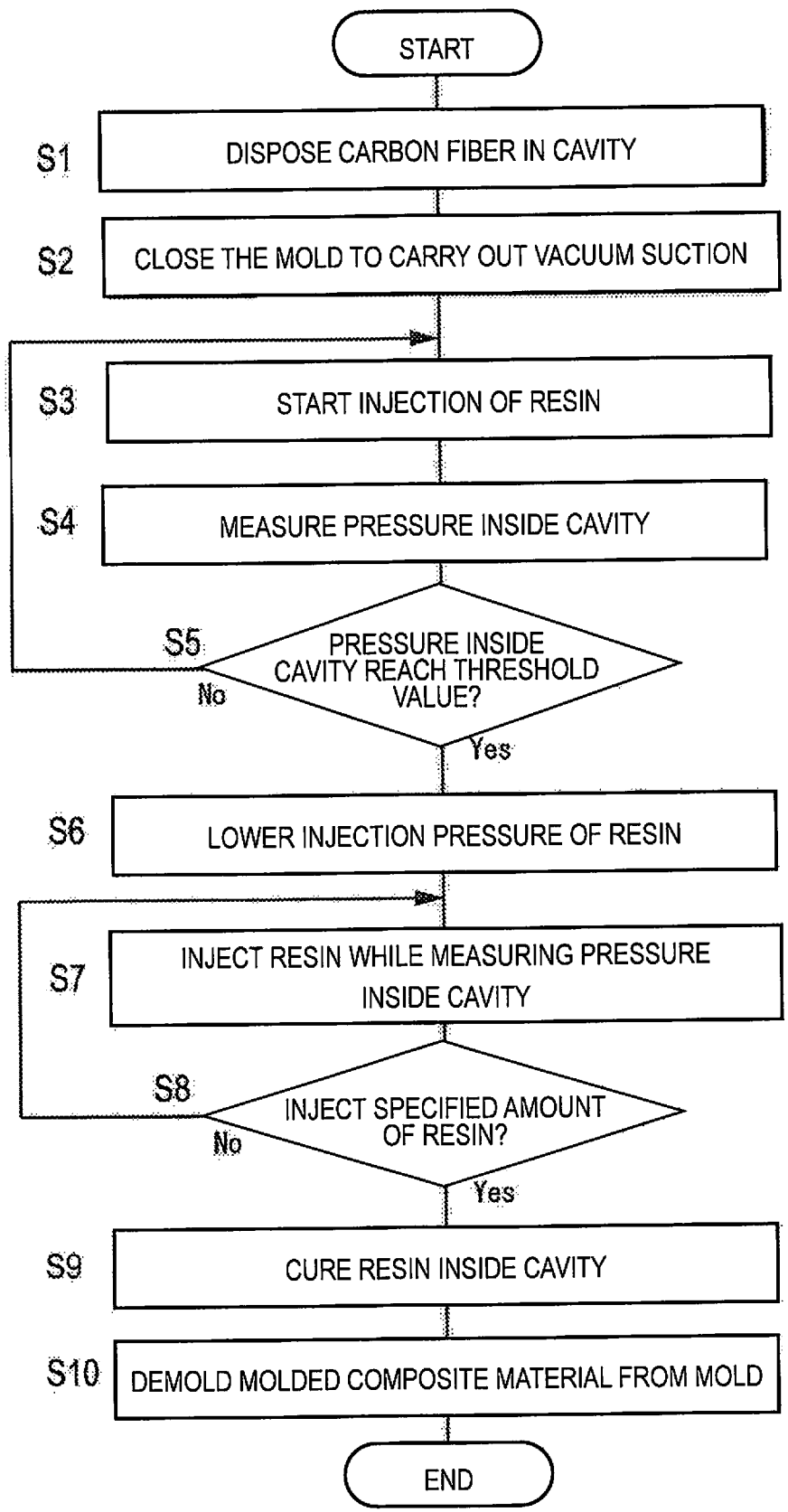
FIG. 3 is a flowchart illustrating the composite material molding method according to the present embodiment.
Figure 4A:
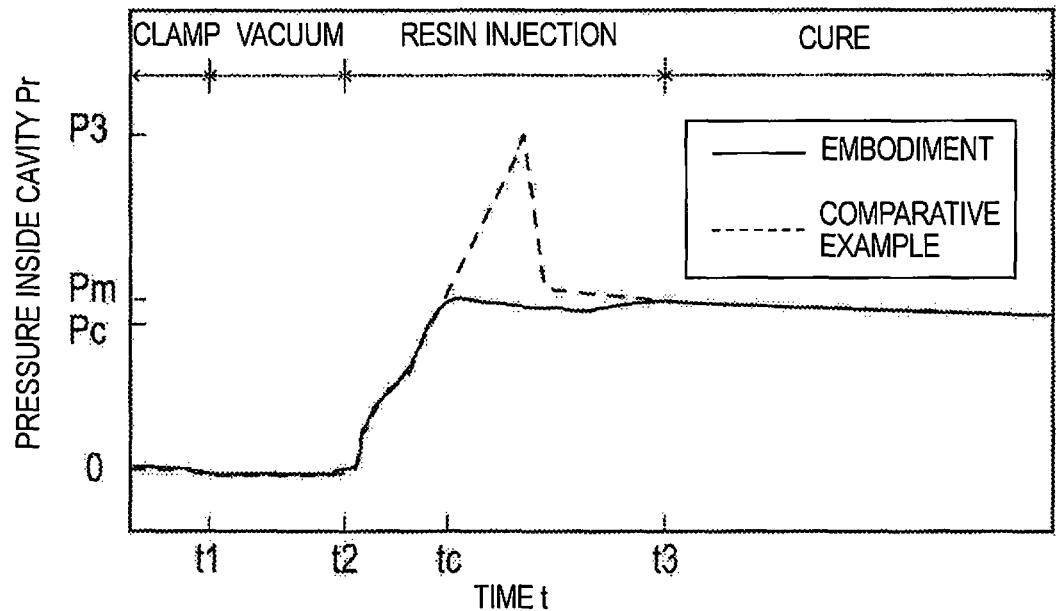
FIG. 4A is a graph representing the temporal transition of the pressure inside the cavity according to the present embodiment.
Figure 4B:
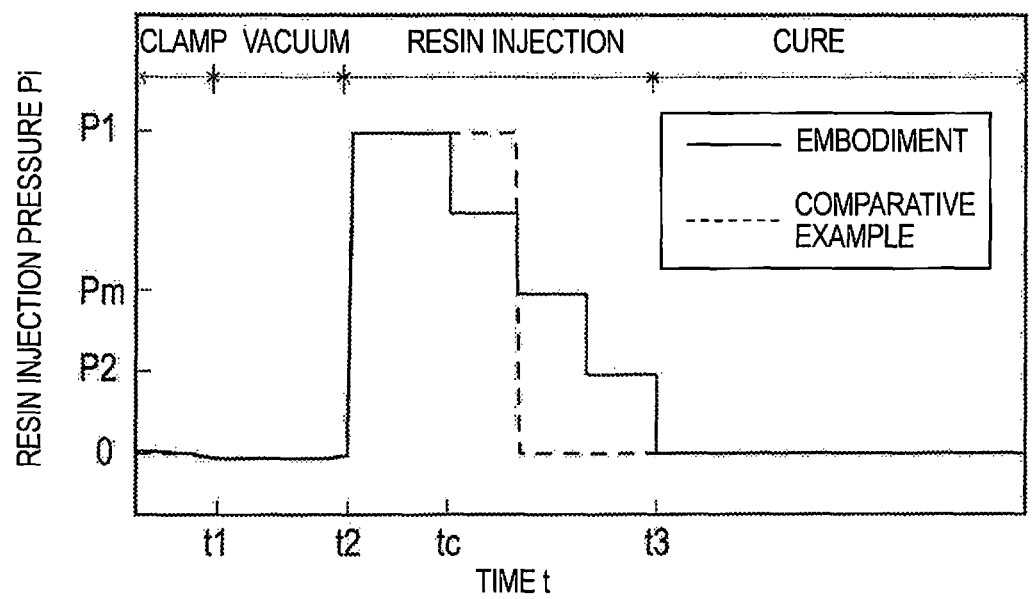
FIG. 4B is a graph representing the temporal transition of the injection pressure of resin according to the present embodiment.
Figure 5A:
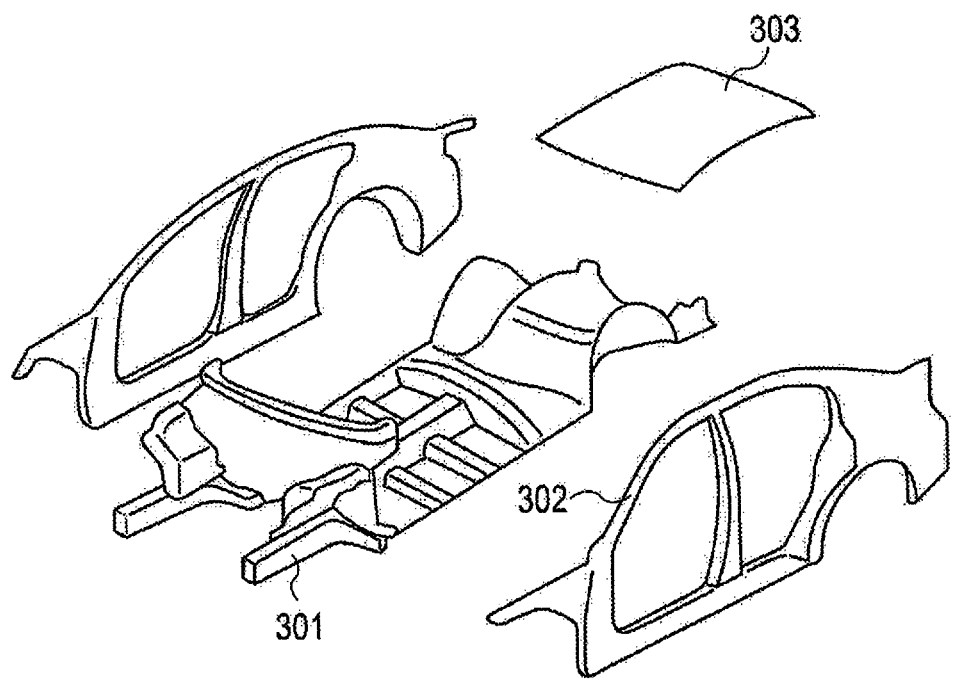
FIG. 5A is an exploded view illustrating automobile parts that use composite material.

FIG. 1 is a schematic view of the composite-material 200 molding device 100. FIG. 2 is a schematic view illustrating the configuration of the resin injection unit 30. FIG. 3 is a flowchart illustrating the composite-material 200 molding method. FIG. 4A is a graph representing the temporal transition of the pressure Pr inside the cavity 15 according to the present embodiment, and FIG. 4B is a graph representing the temporal transition of the resin injection pressure Pi according to the present embodiment. FIG. 5 is a schematic view illustrating a vehicle body 300 and automobile parts 301 to 303 that use composite material 200.

An embodiment of the present invention will be described below based on the drawings.

Figure 5B:
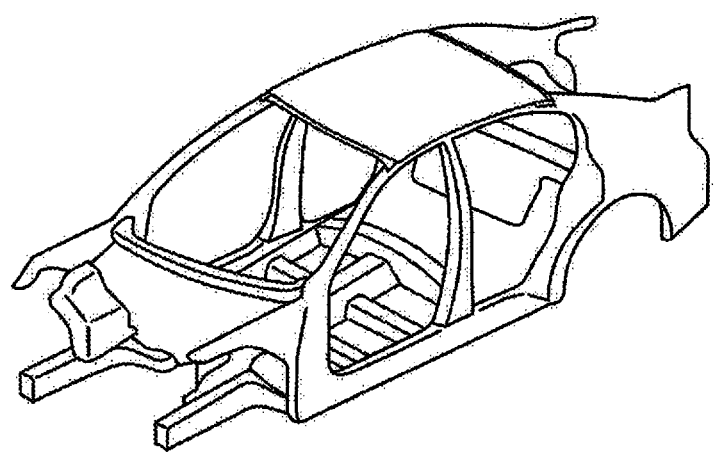
FIG. 5B is a view illustrating a vehicle body in which the parts are joined.

The composite material 200 that is obtained by the molding method and the molding device 100 according to the present embodiment is configured by a reinforcing base material 210 and resin 220. By being combined with the reinforcing base material 210, the composite material 200 is provided with higher strength and rigidity compared to the resin 220 alone. In addition, by using the composite material 200 in frame components, such as a front side member 301 and a pillar 302, and in outer panel components, such as a roof 303, which are parts that are used in the vehicle body 300 of an automobile (refer to FIG. 5B), it becomes possible to reduce the weight of the vehicle body compared to the use of steel material, as illustrated in FIG. 5.

The reinforcing base material 210 is formed of textile sheets, such as carbon fibers, glass fibers, and organic fibers, and is preformed by disposing in a cavity 15 formed in the mold 10 in a laminated state. In the present embodiment, carbon fibers are used, which have a small coefficient of thermal expansion, are excellent in dimensional stability, and have little reduction in mechanical properties, even under high temperatures. The preform may be carried out in a mold other than the mold 10.

Epoxy resins, phenol resins, etc., which are thermosetting resins, are used as the resin 220. In the present embodiment, epoxy resin, which has excellent mechanical properties and dimensional stability, is used. The mainstream epoxy resin is a two-liquid type, which is used by mixing a main agent and a curing agent. Generally, a bisphenol A type of epoxy resin is used for the main agent and an amine type is used for the curing agent, but no limitation is imposed thereby, and the agents may be appropriately selected according to the desired material properties.

To provide an overview with reference to FIG. 1, the molding device 100 according to the present embodiment comprises an openable and closable mold 10 in which is formed a cavity 15 for disposing carbon fiber 210 (corresponding to a reinforcing base material), a pressing part 20 that exerts clamping pressure Pm on the mold 10, a resin injection unit 30 that injects the resin 220 into the cavity 15, and a valve 40 (corresponding to a pressure adjustment unit) that is provided on the resin injection unit 30 and that can freely adjust the injection pressure Pi of the resin 220. The molding device 100 further comprises a pressure gauge 50 that measures the pressure Pr inside the cavity 15, a suction unit 60 that draws a vacuum inside the mold 10, a mold temperature adjustment unit 70 that adjusts the temperature of the mold 10, and a control unit 80 that controls the operation of the entire molding device 100. The control unit 80 controls the operation of the valve 40 based on the pressure Pr inside the cavity 15, which is measured by the pressure gauge 50. The mold 100 will be described in detail below.

The mold 10 comprises a lower die 12 (female mold) and an upper die 11 (male mold), which can be opened and closed. A cavity 15 that can be freely sealed is formed between the upper die 11 and the lower die 12. The carbon fiber 210 is disposed in the cavity 15 in advance, in a laminated and preformed state. An injection port 13 is provided in the upper portion of the upper die 11. The injection port 13 is connected to the resin injection unit 30, and resin 220 is injected from above into the cavity 15. The resin 220 impregnates the inside from the upper surface of the carbon fiber 210. Additionally, a suction opening 14 is provided in the side of the lower die 12. The suction opening 14 is connected to the suction unit 60, and the air inside the cavity 15 is suctioned and removed, thereby creating a vacuum. A sealing member, or the like, may be provided on mating surfaces of the upper die 11 and the lower die 12, in order to put the inside of the cavity 15 in a sealed state.

The pressing part 20 exerts clamping pressure Pm on the upper die 11 of the mold 10. The pressing part 20 comprises a cylinder 21 that uses fluid pressure, such as hydraulic pressure, and adjusts the clamping pressure Pm by controlling the hydraulic pressure, etc.

The resin injection unit 30 comprises a main agent tank 31 filled with the main agent, a curing agent tank 32 filled with the curing agent, a tube 36 that forms the feed flow channel for the main agent, the curing agent, and the resin 220 in which the agents are mixed, a pressure gauge 34 that measures the injection pressure Pi of the resin 220 into the cavity 15, and a valve 40 that can freely adjust the injection pressure Pi of the resin 220. The pressure gauge 34 is disposed on the tube 36 in the vicinity of the injection port 13, in order to measure the injection pressure Pi of the resin 220.

Referring to FIG. 2, the resin injection unit 30 further comprises a pair of pumps 35a, 35b that are respectively disposed in a pair of tubes 33a and 33b, which are connected to the main agent tank 31 and the curing agent tank 32. The pumps 35a and 35b discharge the main agent and the curing agent toward the valve 40 at a constant pressure.

The valve 40 is connected to the injection port 13 of the mold 10 via the tube 36. The valve 40 comprises a cylinder 41 and a piston 42. The cylinder 41 comprises two chambers 41u and 41d, which are partitioned by the proximal end portion 42a of the piston 42. The piston 42 is moved in the vertical direction in the figure by adjusting the fluid pressure, such as air pressure and hydraulic pressure that is supplied to the two chambers 41u and 41d. The opening amount of the flow path of the main agent and the curing agent is adjusted by the piston 42 being moved inside the cylinder 41. The amount Qi of the resin 220 injected into the cavity 15 is adjusted by the opening amount of valve 40, to adjust the injection pressure Pi of the resin 220 that is transported to the mold 10. It is known that, when the viscosity is 200 (mPa·s) or less in a state before the resin 220 is cured, the injection amount Qi and the injection pressure Pi of the resin 220 into the cavity 15 are in a correlated relationship, represented by the formula $Qi^2=A \times Pi$ (A is a value determined by the coefficient of discharge, the flow channel area, and the fluid density).

The cylinder 41 comprises upper side suction ports 44a and 44b, and lower side discharge ports 45a and 45b. When the piston 42 is moved upward in the figure, the lower side discharge ports 45a and 45b are opened. The main agent and the curing agent that are ejected from each of the lower side discharge ports 45a and 45b, are mixed to become the resin 220. The resin 220 is discharged into the injection port 13 via the tube 36. When the piston 42 is moved downward in the figure, the upper side suction ports 44a and 44b and the lower side discharge ports 45a and 45b are linked via recesses 43a and 43b formed to the piston 42. The main agent and the curing agent pass through the recesses 43a and 43b from the lower side discharge ports 45a and 45b, and are returned from the upper side suction ports 44a and 44b to the main agent tank 31 and the curing agent tank 32. With this operation, the main agent and the curing agent are circulated in the tubes 33a, 33b under a constant pressure.

Referring to FIG. 1 again, the pressure gauge 50 comprises a strain gauge, and the like, and is disposed on the mold 10 for measuring the pressure Pr inside the cavity 15.

The suction unit 60 comprises a vacuum pump (not shown). The suction unit 60 suctions the air (vacuum) inside the cavity 15 from the suction opening 14 before the injection of the resin 220 to create a vacuum inside of the cavity 15.

The mold temperature adjustment unit 70 comprises a heating member 71 and heats the mold 10 to the curing temperature of the resin 220, to cure the resin 220 that is injected inside the cavity 15. The heating member is an electric heater, and directly heats the mold 10. The heating member is not limited thereto; for example, a thermal catalyst, such as oil may be heated by an electric heater, and the thermal catalyst may be circulated inside the mold 10 in order to adjust the temperature of the mold 10.

The control unit 80 controls the operation of the entire molding device 100. The control unit 80 comprises a storage unit 81, a calculation unit 82, and an input/output unit 83. The input/output unit 83 is connected to the pressure gauges 34 and 50, the valve 40, the suction unit 60, and the mold temperature adjustment unit 70. The storage unit 81 is configured with a ROM and RAM, and stores data in advance, such as the threshold value Pc of the pressure Pr inside the cavity 15, described later. The calculation unit 82 is configured mainly by a CPU, and receives data on the injection pressure Pi of the resin 220 and on the pressure Pr inside the cavity 15 from the pressure gauges 34 and 50, via the input/output unit 83. The calculation unit 82 calculates the piston 42 position of the injection valve 40, the suction pressure of the suction unit 60, and the heating temperature of the mold 10 by the mold temperature adjustment unit 70, based on data read from the storage unit 81 and the data received from the input/output unit 83. Control signals based on the calculated data are transmitted to the valve 40, the suction unit 60, and the mold temperature adjustment unit 70, via the input/output unit 83. In this manner, the control unit 80 controls the injection pressure Pi of the resin 220, the pressure Pr inside the cavity 15 for the vacuum, and the molding temperature, etc.

The procedure of the composite-material 200 molding method will be described below, with reference to FIG. 3.

The composite-material 200 molding method comprises a step of disposing the carbon fiber 210 (Step S1), a step of carrying out the vacuum suction (Step S2), steps of injecting the resin 220 (Steps S3-S8), a step of curing the resin 220 (Step S9), and a demolding step (Step S10), as illustrated in FIG. 3. Each step will be described in detail below. Excluding the operations of Steps S1, S9, and S10, the control unit 80 executes the process of each step.

First, carbon fibers 210 are laminated, preformed, and disposed inside the cavity 15 of the mold 10 (Step S1). At this time, the inner surface of the mold that faces the cavity 15 is degreased using a predetermined organic solvent, and a mold releasing treatment is administered using a mold releasing agent.

Next, the mold 10 is closed, air is drawn out through the suction opening 14 by the suction unit 60 to create a vacuum, and the inside of the cavity 15 is put in a vacuum state (Step S2). At this time, the pressure is adjusted by the control unit 80 based on the data of the pressure gauge 50 so as to be a negative pressure. After the vacuum is completed, the suction opening 14 is completely closed, and kept in a closed state until the molding has ended. By carrying out the vacuum, it is possible to prevent air bubbles from being generated on the surface, to reduce voids and pits in the composite material 200, which is a molded article, and to improve the mechanical properties and the design of the composite material 200.

The injection pressure Pi of the resin 220 is adjusted to be a first pressure P1 (refer to FIG. 4B) that is higher than the clamping pressure Pm, to start the injection of the resin 220 from the injection port 13 (Step S3). The injected resin 220 impregnates the carbon fiber 210 from the upper surface. When the injected resin 220 completely fills the inside of the cavity 15, the injection pressure Pi and the clamping pressure Pm become substantially the same pressure.

After starting the injection of the resin 220, the pressure Pr inside the cavity 15 is measured by the pressure gauge 34 within a predetermined time (Step S4). Injection of the resin 220 and the measuring of the pressure Pr inside the cavity 15 are continued until the pressure Pr inside the cavity 15 reaches a threshold value Pc (Step S5: "No," Steps S3, S4). When the pressure Pr inside the cavity 15 reaches the threshold value Pc (Step S5: "Yes"), the injection pressure Pi of the resin 220 is lowered (Step S6).

The threshold value Pc is set in advance to a value that is a little lower than the clamping pressure Pm, based on the material characteristics, the injection amount, and the injection speed, etc., of the resin 220. In the present embodiment, the threshold value Pc is set to 90% of the clamping pressure Pm. Giving consideration to errors in the pressure measurements, for example, the threshold value may be selected from values in the range of 85%-95% of the clamping pressure Pm. By setting the threshold value Pc to a high value, it is possible to increase the injection pressure Pi of the resin 220 to the vicinity of the clamping pressure Pm, to shorten the injection time. In addition, by the pressure Pr inside the cavity 15 being in a high state, it is possible to improve the impregnating ability of the resin 220 in the carbon fiber 210.

The injection pressure Pi of the resin 220 is measured and adjusted to be between the first pressure P1 that is higher than the clamping pressure Pm and the second pressure P2 that is lower than the clamping pressure Pm, and the injection pressure Pi of the resin 220 is lowered from the pressure that is higher than the clamping pressure Pm to the pressure that is lower than the clamping pressure Pm at least once. With this control, the resin 220 is injected such that the pressure inside the cavity 15 does not exceed the clamping pressure Pm from the start of injection to the end of injection of the resin 220 (Step S7). As described above, from the point of view of shortening the injection time, the threshold value Pc is preferably set to a value that is as high as possible. However, in the injection pressure control of the resin 220, it is preferable to set the threshold value Pc such that an overshoot does not occur, in which the pressure Pr inside the cavity 15 exceeds the clamping pressure Pm.

The operation of Step S7 is repeated until the resin 220 completely fills the inside of the cavity 15 (Step S8: "No," Step S7).

When the injection of a specified amount of the resin 220 inside the cavity 15 is ended (Step S8: "Yes"), it is left to stand until the resin 220 inside the cavity 15 is sufficiently cured (Step S9). The temperature of the entire mold 10 is adjusted in advance to the curing temperature of the resin 220, by the mold temperature adjustment unit 70.

When the mold 10 is opened and the molded composite material 200 is demolded, the molding is complete (Step S10).

Next, the control of the injection pressure Pi of the resin 220 according to the molding method of the present embodiment will be described in detail, with reference to FIG. 4.

The graphs illustrated by the solid lines in FIGS. 4A and 4B illustrate the temporal transition of the pressure Pr inside the cavity 15 and the injection pressure Pi of the resin 220 according to the molding method of the present embodiment illustrated in FIG. 3. The graph illustrated by the dashed line is a comparative example, and illustrates the temporal transition of the pressure Pr inside the cavity 15 and the injection pressure Pi of the resin 220 when the injection pressure Pi of the resin 220 is a constant, high-pressure injection until the injection is completed. Time 0 (sec)-t1 is the clamping step, time t1-t2 is the vacuum step, time t2-t3 is the injection step of the resin 220, and t3 onward is the curing step of the resin 220. Here, after injecting the resin 220 at the injection pressure Pi, the pressure Pr inside the cavity 15 will not immediately increase, but will gradually increase with a delay from the injection pressure Pi, as illustrated in FIGS. 4A and 4B.

When the pressure Pr inside the cavity 15 increases and reaches the threshold value Pc, the injection pressure Pi of the resin 220 is gradually lowered so as to indicate the stepped shape illustrated in FIG. 4B. At this time, the valve 40 is controlled by the control unit 80 such that the pressure Pr inside the cavity 15 does not exceed the clamping pressure Pm from the start of injection to the end of injection of the resin 220, illustrated in FIG. 4A, and the injection pressure Pi of the resin 220 is adjusted to be between the first pressure P1 that is higher than the clamping pressure Pm and the second pressure P2 that is lower than the clamping pressure Pm. The injection pressure Pi of the resin 220 is lowered at least once from the pressure that is higher than the clamping pressure Pm to the pressure that is lower than the clamping pressure Pm. Any value between gauge pressure 0 (MPa) to the clamping pressure Pm may be set as the second pressure P2.

As illustrated by the dashed line in FIG. 4A, in the comparative example in which the injection pressure Pi of the resin 220 is a constant, high-pressure injection until the injection is completed, the pressure Pr inside the cavity 15 increases to a pressure P3 that is significantly higher than the clamping pressure Pm.

In contrast, in the present embodiment, the resin 220 is injected such that the pressure Pr inside the cavity 15 does not exceed the clamping pressure Pm from the start of injection to the end of injection of the resin 220, by controlling the injection pressure Pi of the resin 220. By carrying out the injection such that the pressure Pr inside the cavity 15 does not exceed the clamping pressure Pm, it is possible to suppress the clamping pressure Pm that is generated by the pressing part 20. By being able to control the clamping pressure Pm, it becomes possible to miniaturize the pressing machine, which contributes to a reduction in equipment cost.

In addition, in the molding method of the present embodiment, the pressure Pr inside the cavity 15 does not rapidly decrease when starting the curing, as in the case of the comparative example (dashed line in FIG. 4A). If the pressure declines rapidly, the contraction rate of the resin 220 increases. Therefore, according to the molding method of the present embodiment, it is possible to decrease the mold contraction rate of the composite material 200, which is the molded article, and to stably obtain the shape according to the design, compared to when the high-pressure injection of the resin 220 is constant, such as in the comparative example. As a result, it is possible to obtain a high-quality, composite material 200 molded article that has high dimensional stability.

The control of the injection pressure Pi of the resin 220 may be appropriately changed according to the material characteristics of the resin 220. For example, the control may be appropriately changed according to the curing time, from the injection of resin 220 into the cavity 15, to the curing. If using a resin 220 with a short curing time, it is necessary to shorten the injection time of the resin 220; therefore, the injection pressure Pi of the resin 220 is set to the first pressure P1 from the start of the injection. Injection of the resin 220 is thereby started at a high pressure, and the pressure Pr inside the cavity 15 is controlled to be a value that is as close to the clamping pressure Pm as possible. Conversely, if using a resin 220 with a long curing time, since the injection time of the resin 220 can be increased, it is also possible to make the starting injection pressure Pi of the resin 220 to be a value that is lower than the clamping pressure Pm. However, in this case as well, the injection pressure Pi of the resin 220 is set to a pressure that is higher than the clamping pressure Pm during the injection, in order to shorten the molding time.

As described above, in the molding device 100 and the molding method according to the present embodiment, when injecting the resin 220 into the cavity 15, the injection pressure Pi of the resin 220 is adjusted to be between the first pressure P1 that is higher than the clamping pressure Pm and the second pressure P2 that is lower than the clamping pressure Pm, and the injection pressure Pi of the resin 220 is lowered from a pressure that is higher than the clamping pressure Pm to a pressure that is lower than the clamping pressure Pm at least once. The resin 220 is thereby injected such that the pressure Pr inside the cavity 15 does not exceed the clamping pressure Pm from the start of injection to the end of injection of the resin 220.

According to the molding device 100 configured in this manner and the molding method that uses the molding device 100, by having a period of time in which the resin 220 is injected at the pressure that is higher than the clamping pressure Pm between the start of injection and the end of injection, the average injection pressure from the start of injection to the end of injection becomes higher compared to injecting at the pressure that is lower than the clamping pressure Pm from the start of injection to the end of injection. As a result, it is possible to shorten the injection time of the resin 220, and to shorten the molding time. In addition, by adjusting the injection pressure Pi of the resin 220 such that the pressure Pr inside the cavity 15 does not exceed the clamping pressure Pm, it is possible to suppress the clamping pressure Pm. By being able to control the clamping pressure Pm, it becomes possible to miniaturize the pressing machine, which contributes to a reduction in equipment cost.

Additionally, in the molding device 100 and the molding method according to the present embodiment, the injection pressure Pi of the resin 220 is gradually lowered from the pressure that is higher than the clamping pressure Pm to the pressure that is lower than the clamping pressure Pm.

According to the molding device 100 configured in this manner and the molding method that uses the molding device 100, the average injection pressure from the start of injection to the end of injection becomes higher compared to injecting at the low pressure from the start of injection to the end of injection. As a result, it is possible to shorten the injection time of the resin 220, and to shorten the molding time.

Additionally, in the molding device 100 and the molding method according to the present embodiment, when the pressure Pr inside the cavity 15 is increased and reaches a threshold value Pc that is set in advance, the injection pressure Pi of the resin 220 is lowered from the first pressure.

According to the molding device 100 configured in this manner and the molding method that uses the molding device 100, control becomes easy by providing a reference value for controlling the injection pressure Pi of the resin 220.

Furthermore, in the molding device 100 and the molding method according to the present embodiment, the injection pressure Pi of the resin 220 at the start of injection is set to the first pressure.

According to the molding device 100 configured in this manner and the molding method that uses the molding device 100, by carrying out a high-pressure injection at the start of injection of the resin 220, when the pressure Pr inside the cavity 15 is still in a low state, the pressure difference between the pressure Pr inside the cavity 15 and the injection pressure Pi of the resin 220 becomes large, and it becomes easy for the resin 220 to flow into the cavity 15. As a result, it is possible to increase the injection speed of the resin 220, and to further shorten the molding time.

Furthermore, in the molding device 100 and the molding method according to the present embodiment, inside of the mold 10 is vacuumed before injecting the resin 220.

According to the molding device 100 configured in this manner and the molding method that uses the molding device 100, it is possible to prevent the generation of air bubbles on the surface and inside the resin 220 after injecting the resin 220, and to reduce voids and pitting in the composite material 200, which is the molded article, by putting the inside of the cavity 15 in a vacuum state before injecting the resin 220. It is thereby possible to improve the mechanical properties and the design of the composite material 200.

In addition, in the molding device 100 and the molding method according to the present embodiment, the reinforcing base material 210 is formed of carbon fibers.

According to the molding device 100 configured in this manner and the molding method that uses the molding device 100, by using carbon fibers in the reinforcing base material, it is possible to mold a composite material 200 that has a small coefficient of thermal expansion, is excellent in dimensional stability, and has little reduction in mechanical properties even under high temperatures.

Additionally, in the molding device 100 and the molding method according to the present embodiment, the composite material 200' is used for automobile parts.

According to the molding device 100 configured in this manner and the molding method that uses the molding device 100, it is possible to mold composite material 200 automobile parts that are suitable for mass production, and to reduce the weight of the vehicle body.

The composite-material 200 molding method and molding device 100 were described through embodiments, but the present invention is not limited to the configuration described in the embodiment, and may be appropriately modified based on the descriptions of the claims.

For example, in the present embodiment, a thermosetting resin was used as the resin 220, but a thermoplastic resin may be used as well. In this case, the mold temperature adjustment unit 70 further comprises a cooling member 72, the mold 10 is heated by the heating member 71 while injecting the resin 220 into the cavity 15, and the mold 10 is cooled after injecting the resin 220. The viscosity of the resin 220 during the injection of the resin 220 is thereby reduced so as to easily impregnate the carbon fiber 210, and the resin 220 can be cured by cooling after the injection.

Additionally, in the present embodiment, the pressure Pr inside the cavity 15 is measured by a pressure gauge 50, but the measurement method is not limited thereto, and may be inferred from the injection pressure Pi of the resin 220, the size of the injection port 13, and the volume of the cavity 15.

In addition, in the present embodiment, the injection of the resin 220 starts with the injection pressure Pi of the resin 220 being a pressure that is higher than the clamping pressure Pm (first pressure P1), but it is sufficient if there is a point in time when the injection pressure Pi of the resin 220 becomes the first pressure P1 from the start of injection to the end of injection.

Additionally, in the present embodiment, after the pressure inside the cavity 15 reaches the threshold value Pc, the injection pressure Pi of the resin 220 is gradually decreased in a stepwise manner (Step S6 in FIG. 3, refer to FIG. 4B). The pattern with which the injection pressure Pi is decreased is not limited to the illustrated stepwise pattern, and any appropriate pattern may be set. For example, it is possible to decrease the injection pressure Pi from a pressure that is higher than the clamping pressure Pm to a pressure that is lower than the clamping pressure Pm at one time (at once), or gradually lowered so as to form a curve.

In addition, in the present embodiment, an injection port 13 of the resin 220 is provided in the upper die 11, and a suction unit 60 for vacuuming is provided in the lower die 12, but they may be respectively provided in either the upper die 11 or the lower die 12.

Furthermore, in the present embodiment, the numbers of the injection port 13 and the suction opening 14 were both one, but the numbers are not limited thereto, and a plurality thereof may be provided.

The invention claimed is:

1. A composite material molding method for forming a composite material comprising:
   disposing a reinforcing base material in a cavity inside an openable and closable mold,
   injecting resin in the cavity in a state in which a clamping pressure is exerted on the mold, and
   curing the resin, wherein
   when injecting the resin into the cavity, an injection pressure of the resin is adjusted between a first pressure that is higher than the clamping pressure and a second pressure that is lower than the clamping pressure, the injection pressure being initially set to the first pressure and afterward lowered from the first pressure when the pressure inside the cavity increases and reaches a threshold value that is smaller than the clamping pressure, the injection pressure being lowered in a plurality of steps such that pressure inside the cavity does not exceed the clamping pressure from a start of injecting the resin to an end of the injecting the resin, and the injection pressure being held constant between each of the steps.

2. The composite material molding method according to claim 1, wherein
   an inside of the mold is in a vacuum state before injecting the resin.

3. The composite material molding method according to claim 1, wherein
   the reinforcing base material is formed from carbon fibers.

4. The composite material molding method according to claim 1, wherein
   the composite material is used for an automobile part.

5. A composite material molding device, comprising:
   an openable and closable mold in which is formed a cavity for disposing a reinforcing base material;
   a pressing part configured to exert a clamping pressure on the mold;
   a resin injection unit configured to inject resin into the cavity,
   a pressure adjustment unit provided in the resin injection unit and configured to freely adjust an injection pressure; and a control unit configured to control operation of the pressure adjustment unit based on pressure inside the cavity, the control unit being configured to control the operation of the pressure adjustment unit to adjust the injection pressure of the resin between a first pressure that is higher than the clamping pressure and a second pressure that is lower than the clamping pressure, and the control unit being configured to set the injection pressure to the first pressure initially and afterward lower the injection pressure from the first pressure when the pressure inside the cavity increases and reaches a threshold value that is smaller than the clamping pressure, the control unit being configured to execute the lowering of the injection pressure in a plurality of steps from a pressure such that the pressure inside the cavity does not exceed the clamping pressure from a start of injection to an end of the injection of the resin and such that the injection pressure is held constant between each of the steps.

6. The composite material molding device according to claim 5, further comprising a suction unit that creates a vacuum state inside of the mold, wherein the control unit controls the operation of the suction unit to create a vacuum inside of the mold before injecting the resin.

7. The composite material molding device according to claim 5, wherein the reinforcing base material is formed from carbon fibers.

8. The composite-material molding device according to claim 5, wherein the composite material is used for an automobile part.

9. The composite material molding method according to claim 1, further comprising setting the threshold value to 85%-95% of the clamping pressure.

10. The composite material molding method according to claim 5, wherein the controller is configured to set the threshold value to 85%-95% of the clamping pressure.

* * * * *